(12) United States Patent
Hirano (10) Patent No.: US 7,874,334 B2
(45) Date of Patent: Jan. 25, 2011

(54) PNEUMATIC TIRE FOR MOTORCYCLE

(75) Inventor: Takashi Hirano, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 494 days.

(21) Appl. No.: 11/816,644

(22) PCT Filed: Feb. 15, 2006

(86) PCT No.: PCT/JP2006/302634

§ 371 (c)(1),
(2), (4) Date: Aug. 20, 2007

(87) PCT Pub. No.: WO2006/088048

PCT Pub. Date: Aug. 24, 2006

(65) Prior Publication Data

US 2008/0314485 A1    Dec. 25, 2008

(30) Foreign Application Priority Data

Feb. 21, 2005    (JP) .............................. 2005-044499

(51) Int. Cl.
*B60C 9/18*    (2006.01)
*B60C 9/22*    (2006.01)
*B60C 9/28*    (2006.01)
*B60C 11/00*    (2006.01)

(52) U.S. Cl. ................. 152/526; 152/531; 152/533; 152/537; 152/538; 152/209.1; 152/209.5

(58) Field of Classification Search ............ 152/538, 152/209.1, 209.5
See application file for complete search history.

(56) References Cited

U.S. PATENT DOCUMENTS 5,562,792 A * 10/1996 Caretta ...................... 156/117

FOREIGN PATENT DOCUMENTS

JP    61-27707 A    2/1986

(Continued)

OTHER PUBLICATIONS

Machine translation of JP 07-108805, 1995.*

*Primary Examiner*—Justin Fischer
(74) *Attorney, Agent, or Firm*—Sughrue Mion, PLLC

(57) ABSTRACT

The present invention provides a pneumatic tire for a motorcycle capable of satisfying all of high-speed durability, turning performance and slide controllability.

The invention relates to a pneumatic tire 10 for a motorcycle having a bead core 12, a carcass 14, a tread rubber 18, a side rubber 26 and a spiral belt 30.

The number of cords Nmc in the spiral belt 30 in the center area is set to 30 to 70/50 mm, and the number of cords Nms in the spiral belt 30 in the shoulder area is set to 10 to 45/50 mm (Nmc/Nms=1.5 to 3.0). The tread rubber 18 is set to tan σ/E'=0.06 to 0.14 MPa$^{-1}$ in the center area CA and the tread rubber 18 is set to tan σ/E'=0.12 to 0.16 MPa$^{-1}$ in the shoulder area SA (TEc/TEs=0.4 to 0.9).

17 Claims, 1 Drawing Sheet

FOREIGN PATENT DOCUMENTS

| | | | |
|---|---|---|---|
| JP | 61-122006 A | | 6/1986 |
| JP | 3-186402 | * | 8/1991 |
| JP | 6-40210 A | | 2/1994 |
| JP | 7-108805 A | | 4/1995 |
| JP | 9-118109 A | | 5/1997 |
| JP | 10-81111 A | | 3/1998 |
| JP | 10-86608 A | | 4/1998 |
| JP | 2000-1107 | * | 1/2000 |
| JP | 2000-158910 A | | 6/2000 |
| JP | 2003-515487 A | | 5/2003 |
| JP | 2003-276404 A | | 9/2003 |
| WO | 03/095242 A1 | | 11/2003 |

* cited by examiner

FIG. 1

PNEUMATIC TIRE FOR MOTORCYCLE

TECHNICAL FIELD

The present invention relates to a pneumatic tire for a motorcycle, and more particularly, to a pneumatic tire for a motorcycle having a spiral belt between a carcass and a tread rubber.

BACKGROUND ART

Conventionally, a pneumatic tire for a motorcycle having a spiral belt between a carcass and a tread rubber is known (see patent documents 1 to 6 for example). In the examples described in patent documents 1 to 4, a spiral belt is formed by coating a belt cord with rubber, and in order to enhance the high-speed durability and steering stability, the number of cords embedded in the spiral belt is varied (increased) from a center area to shoulder areas. In the examples described in patent documents 5 and 6, the number of cords embedded in the spiral belt is the same from the center area to the shoulder areas, rubber having excellent high-speed durability is provided at the center area, and rubber having excellent turning performance is provided at the shoulder area.

Patent Document 1: Japanese Patent Application Laid-open No. 6-40210

Patent Document 2: Japanese Patent Application Laid-open No. 9-118109

Patent Document 3: Japanese Patent Application Laid-open No. 10-81111

Patent Document 4: Japanese Patent Application Laid-open No. 10-86608

Patent Document 5: Japanese Patent Application Laid-open No. 61-27707

Patent Document 6: Japanese Patent Application Laid-open No. 7-108805

DISCLOSURE OF THE INVENTION

Problem to be Solved by the Invention

In a motorcycle racing rear tire, high-speed durability, turning performance and slide controllability are required, as is known. In a motorcycle pneumatic tire described in patent documents 1 to 4, it is not possible to satisfy all of the high-speed durability, turning performance and slide controllability requirements, as is described in these documents. Hence, the present inventors conducted intensive research in order to develop a motorcycle pneumatic tire having all of the high-speed durability, turning performance and slide controllability in excellent balance.

The present inventors evaluated motorcycle pneumatic tires in which the spiral belt was employed and in which the number of cords embedded in the center area is higher than that in the shoulder area, and the inventors obtained the following results. That is, motorcycle pneumatic tires were prepared in which the driven number of cords in the spiral belt in the center area was higher than that in the shoulder area, and in which rubber having high heat-resistance is provided at the entire tread area, and the performance of the tires was evaluated.

In the case of such a structure, since rubber having the high heat-resistance was employed together with the spiral belt, high-speed durability could be secured, and by increasing the number of cords embedded in the spiral belt in the center area as compared with the shoulder area, slide controllability could be secured. However, in this structure, it was clear that the physical properties of the rubber were insufficient to secure grip performance and, thus, efficient lateral force could not be exhibited and turning performance was inferior.

Motorcycle pneumatic tires were prepared in which the number of cords embedded in a spiral belt in the center area was increased as compared with the shoulder area, and in which rubber having high grip performance was provided at the entire tread area on the outer peripheral side of the spiral belt, and performance was evaluated. In the case of this structure, since the rubber having high grip performance was employed, excellent turning performance could be secured, and since the spiral belt was employed and the number of cords in the spiral belt embedded in the center area was increased as compared with the shoulder area, the slide controllability could be secured. However, in this structure, although the spiral belt was employed to secure the high-speed durability, it was clear that the physical properties of the rubber were insufficient to secure high-speed durability and, as a result, high-speed durability was inferior. Further, straight-travel stability was also inferior.

Next, motorcycle pneumatic tires were prepared in which the number of cords embedded in the spiral belt was the same from the center area to the shoulder area, in which rubber having high heat-resistance was provided at the center area, and in which rubber having high grip performance was provided at the shoulder area, as described in patent documents 5 and 6, and performance was evaluated. In the case of this structure, since both the spiral belt and rubber having excellent heat-resistance were employed, excellent high-speed durability could be secured, and since the rubber having excellent grip performance, excellent lateral force could be exhibited, and turning performance was secured. According to this structure, however, if the number of cords embedded is set to that required for securing high-speed durability, both the cornering limit value and the cornering power are increased. With this, the inclination of curve of a graph (lateral axis: slip angle, vertical axis: force) of the cornering force becomes steep and the maximum value thereof becomes great. Thus, while the limit value is high, if the tire starts slipping, behavior of the tire becomes unpredictable and it becomes difficult to handle. That is, it was clear that there was a large drop down of the grip force once the peak lateral force was exceeded, and that controllability was poor.

Thus, in the conventional motorcycle pneumatic tire, it was not possible to satisfy all of high-speed durability, turning performance and slide controllability.

The present invention has been accomplished in view of the above-described circumstances, and it is an object of the invention to provide a pneumatic tire for a motorcycle capable of satisfying all of high-speed durability, turning performance and slide controllability.

Means for Solving Problem

To achieve the above object, according to an invention described in claim 1, there is provided a pneumatic tire for a motorcycle comprising a pair of left and right bead cores extending along a circumferential direction of the tire; bead apex rubbers which are respectively disposed at outer sides of the pair of left and right bead cores in a radial direction of the tire and which have triangular cross sections; a carcass which extends between the pair of left and right bead cores in a toroidal shape, which has both ends in a widthwise direction of the tire folded back around the pair of left and right bead cores and retained thereat, and which includes at least one layer of carcass ply having a plurality of rubber-coated carcass cords arranged at an inclination angle of from 60° to 90° with respect to an equatorial plane of the tire; a tread rubber which is provided at an outer side of the carcass in the radial direction of the tire and which constitutes a tread portion; a pair of left and right side rubbers which are provided at the outer side of the carcass in an axial direction of the tire and which constitute a sidewall; and a spiral belt which is provided between the carcass and the tread rubber, which comprises at least one belt ply layer formed by spirally winding a rubber-coated cord along the circumferential direction of the tire, and when a region from an edge of a center area that occupies 40% of the tread centered on the tire equatorial plane with respect to the tread surface lateral width, to tread ends is defined as a shoulder area, the spiral belt is disposed to extend across both left and right shoulder areas from the center area of the tread rubber, wherein the number of cords embedded in the spiral belt in the center area is higher than that in the shoulder area, the number of cords embedded in the spiral belt in the center area is set to 30 to 70/50 mm, the number of cords embedded in the spiral belt in the shoulder area is set to 10 to 45/50 mm, when the number of cords embedded in the spiral belt in the center area is defined as Nmc and the number of cords embedded in the spiral belt in the shoulder area is defined as Nms, the relationship (A) Nmc/Nms=1.5 to 3.0 is satisfied, when a tangent loss factor of 4% distortion of the tread rubber at 50° C. is defined as tan σ and a dynamic storage elastic modulus is defined as E', the tread rubber is set to tan σ/E'=0.06 to 0.14 MPa$^{-1}$ in the center area and the tread rubber is set to tan σ/E'=0.12 to 0.16 MPa$^{-1}$ in the shoulder area, and when the tan σ/E' of the tread rubber in the center area is defined as TEc and the tan σ/E' of the tread rubber in the shoulder area is defined as TEs, the relationship (B) TEc/TEs=0.4 to 0.9 is satisfied.

Next, an effect of the invention described in claim 1 will be explained.

As in the invention described in claim 1, if the tire is constituted as described above, the number of cords to be embedded and the physical properties of rubber required for satisfying all of high-speed durability, turning performance and slide controllability are selected in the center area where high-speed durability is required and in the shoulder area where turning performance (grip performance) and slide controllability are required.

That is, the number of cords embedded in the spiral belt in the center area is higher than that in the shoulder area, the number of cords embedded in the spiral belt in the center area is set to 30 to 70/50 mm, the number of cords embedded in the spiral belt in the shoulder area is set to 10 to 45/50 mm, when the number of cords embedded in the spiral belt in the center area is defined as Nmc and the number of cords embedded in the spiral belt in the shoulder area is defined as Nms, Nmc/Nms=1.5 to 3.0 is satisfied. With this, a sufficient number of cords embedded in the spiral belt 30 is secured to enhance a diameter expansion binding force in the center area which comes into contact with the ground when traveling straight, the number of cords embedded in the shoulder area which comes into contact when cornering is set to be lower than that of the center area and with this, it is possible to suppress the generation of a lateral force in the shoulder area. As a result, the high-speed durability in the center area can be enhanced, the threshold limit value of the lateral force in the shoulder area can be suppressed to a low level, performance when the threshold is exceeded can be ameliorated and, thus, the slide controllability can be enhanced.

Further, as in the invention described in claim 1, when a tangent loss factor of 4% of distortion of the tread rubber at 50° C. is defined as tan σ and a dynamic storage elastic modulus is defined as E', tan σ/E' is set to 0.06 to 0.14 Pa$^{-1}$ in the center area of the tread rubber, and tan σ/E' is set to 0.12 to 0.16 MPa$^{-1}$ in the shoulder area. When tan σ/E' in the center area of the tread rubber is defined as TEc and tan σ/E' in the shoulder area of the tread rubber is defined as TEs, TEc/TEs is set to 0.4 to 0.9 (B). With this, a rubber having physical properties of high heat-resistance sufficient to satisfy the high-speed durability is disposed in the center area, and a rubber having physical properties of high grip performance is disposed in the shoulder area. If the rubber having high heat-resistance physical properties sufficient to satisfy the high-speed durability is disposed in the center area, a sufficient number of cords embedded in the spiral belt can be secured to enhance the diameter expansion binding force in the center area, and the high-speed durability can also be achieved.

Further, if the rubber having physical properties of high grip performance is disposed in the shoulder area, the lateral force which was reduced because the number of cords embedded in the shoulder area was set lower than that of the center area, can be compensated for and, thus, both the turning performance and slide controllability can be achieved. A region of the tire from the end of the center area, which occupies an area of 40% centered on the equatorial plane of the tire with respect to the tread surface lateral width, to the tread end is the shoulder area. This is because a ground-contact width of the tire when cornering at a camber angle of 30° or higher at the speed of 80 km/h in the motorcycle falls within the above range.

If the number of cords embedded in the center area of the spiral belt is set smaller than 30/50 mm, a force for binding the expansion of the carcass in the radial direction of the tire cannot be obtained, and a desired shape of the tire and a desired high-speed durability cannot be secured. If the number of cords embedded in the center area of the spiral belt is set higher than 70/50 mm, cords are superposed on each other, causing problems in the production process.

If the number of cords embedded in the shoulder area of the spiral belt is set smaller than 10/50 mm, the lateral force in the shoulder area becomes excessively small, and a grip force at the time of cornering cannot be secured. If the number of cords embedded in the shoulder area of the spiral belt is set higher than 45/50 mm, the lateral force in the shoulder area becomes excessively high, performance when the lateral force threshold value is exceeded becomes erratic, and slide controllability cannot be secured.

If the relation between the number of cords Nmc embedded in the center area of the spiral belt and the number of cords Nms embedded in the shoulder area of the spiral belt becomes smaller than Nmc/Nms=1.5, the number of cords embedded in the center area and the number of cords embedded in the shoulder area become substantially equal to each other and thus, the threshold limit value of the lateral force in the shoulder area is maintained at a high level, performance when the threshold limit value of the lateral force is exceeded becomes unpredictable, and the slide controllability cannot be secured. If the relation between the number of cords Nmc embedded in the center area of the spiral belt and the number of cords Nms embedded in the shoulder area of the spiral belt becomes greater than Nmc/Nms=3.0, a difference in rigidity between the center area and the shoulder area becomes excessively large, there is too large a difference lateral force between the center area and the shoulder area, and the steering stability deteriorates.

The higher the TEc (=tan σ/E') in the center area of the tread rubber, the higher the grip performance in the center area becomes, and the smaller the TEc (=tan σ/E') in the center area of the tread rubber is, the higher the high-speed durability becomes. At that time, if the TEc in the center area of the tread rubber is set smaller than 0.06 MPa$^{-1}$, the rubber becomes excessively hard, and unevenness-absorbing performance at the time of straight travel becomes inferior. If TEc in the center area of the tread rubber is set greater than 0.14 MPa$^{-1}$, the high-speed durability cannot be secured.

If TEs (=tan σ/E') in the shoulder area of the tread rubber is set smaller than 0.12 MPa$^{-1}$, the turning performance (grip performance) cannot be secured. If TEs in the shoulder area of the tread rubber is set greater than 0.16 MPa$^{-1}$, the lateral force in the shoulder area becomes excessively strong, performance when the threshold limit of the lateral force is exceeded becomes erratic, and slide controllability cannot be secured.

If the value of TEc/TEs is set smaller than 0.4, the difference in rigidity between the center area and the shoulder area becomes excessively large, there is a large difference in the lateral force between the center area and the shoulder area, and the steering stability deteriorates. That is, handling neutrality deteriorates near the boundary between the center area and the shoulder area. If the TEc/TEs value is set greater than 0.9, the physical properties of the rubber become substantially equal across the center area and the shoulder area, and the above-mentioned respective performances cannot be satisfied.

According to an invention described in claim 2, in the pneumatic tire for a motorcycle described in claim 1, the rubber-coated cord of the belt ply has a tensile strength of 0.27 N or higher.

Next, an effect of the invention described in claim 2 will be explained.

If, as described in claim 2, the tensile strength of the rubber-coated cord of the spiral belt in the pneumatic tire for a motorcycle described in claim 1 is set to 0.27 N or higher, it is possible to suppress the growth of the carcass in the tire vulcanizing process, and a desired tire shape can be obtained. Further, sufficient rigidity of the spiral belt can be secured.

If the tensile strength of the rubber-coated cord of the spiral belt is less than 0.27 N, growth of the carcass cannot be suppressed in the tire vulcanizing process, and the desired shape of the tire cannot be obtained. Further, the rigidity of the spiral belt becomes insufficient. Thus, a member for reinforcing the spiral belt is required, and this causes the problem that the weight is increased and productivity is deteriorated.

According to an invention described in claim 3, in the pneumatic tire for a motorcycle described in claim 1, an aramid cord having a tensile strength of from 0.27 N to 0.76 N is used as the rubber-coated cord of the belt ply.

Next, an effect of the invention described in claim 3 will be explained.

If, as described in claim 3, in the pneumatic tire for a motorcycle described in claim 1, a non-extensible high elastic aramid cord having the tensile strength of from 0.27 N to 0.76 N is used in the rubber-coated cord of the belt ply, it is possible to obtain the desired tire shape and rigidity without causing problems in the production process.

According to an invention described in claim 4, in the pneumatic tire for a motorcycle described in claim 1, the rubber-coated cord of the belt ply is a steel cord having a tensile strength of from 0.38 N to 1.07 N.

Next, an effect of the invention described in claim 4 will be explained.

If, as described in claim 4, in the pneumatic tire for a motorcycle described in claim 1, the non-extensible high elastic steel cord having the tensile strength of from 0.38 N to 1.07 N is used for the rubber-coated cord of the spiral belt, it is possible to obtain the desired tire shape and rigidity without causing problems in the production process.

According to an invention described in claim 5, in the pneumatic tire for a motorcycle described in claim 4, the high elastic steel cord comprises an open cord.

Next, an effect of the invention described in claim 5 will be explained.

If, as described in claim 5, in the pneumatic tire for a motorcycle described in claim 4, the high elastic steel cord comprises an open cord, it is possible to obtain the desired tire shape and rigidity more precisely.

According to an invention described in claim 6, in the pneumatic tire for a motorcycle described in claim 4, the high elastic steel cord comprises an open cord having a 1×2 configuration.

Next, an effect of the invention described in claim 6 will be explained.

If, as described in claim 6, in the pneumatic tire for a motorcycle described in claim 4, the high elastic steel cord comprises an open cord having a 1×2 configuration, it is possible to obtain the desired tire shape and rigidity more precisely.

EFFECT OF THE INVENTION

According to the motorcycle pneumatic tire of the embodiments as described above in detail, the number of cords embedded in the center area of the spiral belt is set higher than that in the shoulder area, and rubber having high heat-resistance is disposed in the shoulder area of the tread rubber. With this, high-speed durability can be achieved.

If the number of cords embedded in the shoulder area of the spiral belt is set smaller than that in the center area, the threshold limit value of the lateral force can be suppressed to a low value. If a rubber having physical properties of high grip performance is disposed in the shoulder area, a lateral force, which was reduced because the number of cords embedded in the shoulder area was set lower than that of the center area, can be compensated for and, thus, both turning performance and slide controllability can be achieved.

BEST MODE FOR CARRYING OUT THE INVENTION

An embodiment of the invention will be explained with reference to the drawing. Members, structures and disposition explained below do not limit the invention, and the invention can variously be modified along the subject matter of the invention of course.

Figure 1:
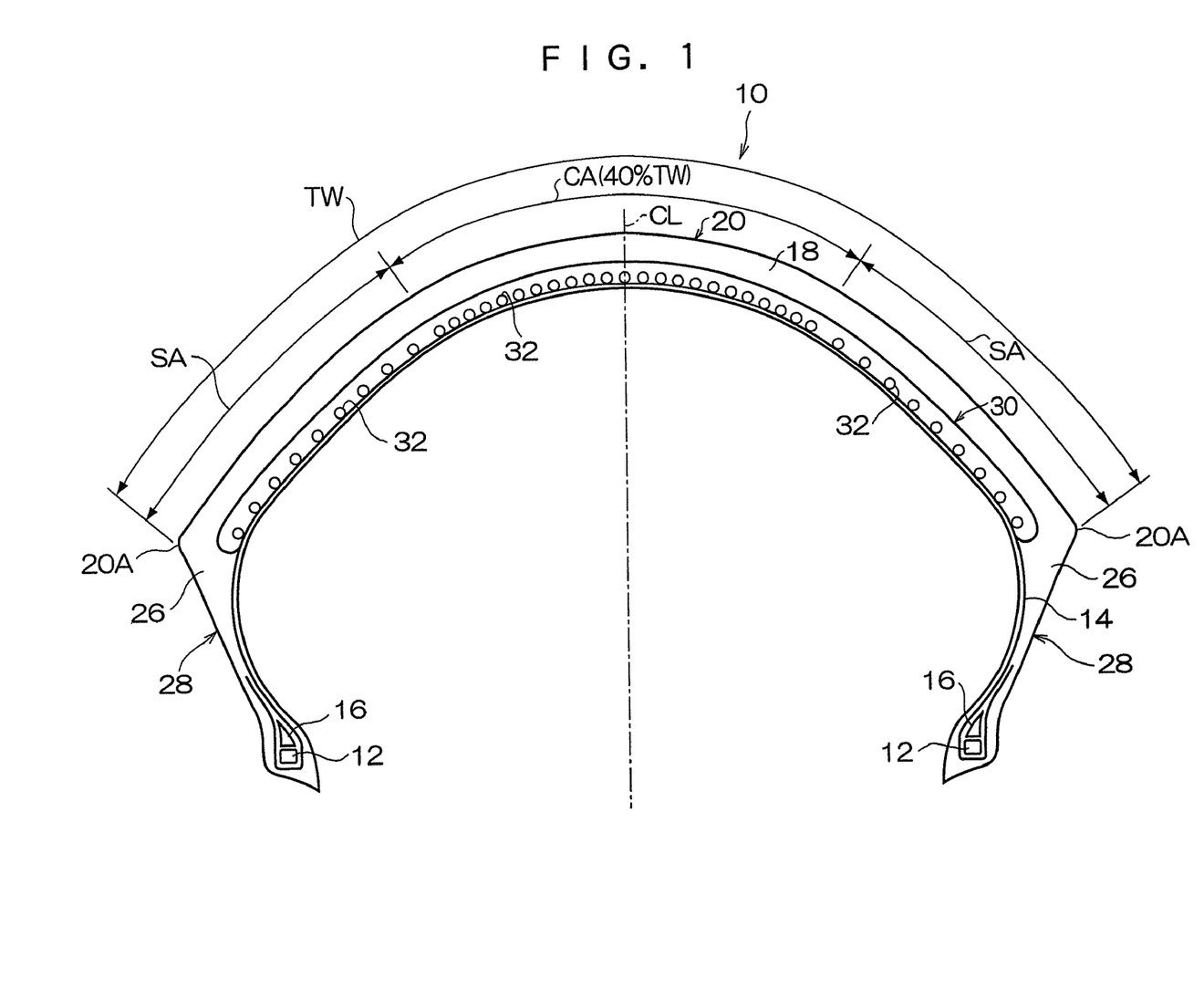
FIG. 1 is a sectional view showing a structure of a pneumatic tire for a motorcycle according to an embodiment.

First, a structure of a pneumatic tire 10 for a motorcycle according to the embodiment will be explained with reference to FIG. 1. The pneumatic tire 10 for a motorcycle according to the embodiment is suitably used as a motorcycle racing rear tire. The motorcycle pneumatic tire 10 of the embodiment includes a pair of left and right non-extensible bead cores 12 extending along a circumferential direction of the tire, and a carcass 14 provided such as to astride between the pair of left and right bead cores 12 in a toroidal shape.

The carcass 14 comprises at least one layer (two layers in this embodiment) of carcass ply which is rubber-coated with a carcass cord comprising a plurality of high elastic textile cords, and both end portions of the carcass 14 in the widthwise direction of the tire are retained to the pair of bead cores 12 such that the end portions are wound up from inside to outside. A carcass cord (not shown) provided on the carcass 14 is disposed at an angle of 60° to 90° with respect to a tire equatorial plane CL. Examples of material of the carcass cord are rayon and nylon.

Bead apex rubbers 16 are disposed at outer side of the pair of left and right bead cores 12 in the radial direction of the tire. Each of the bead apex rubbers 16 has a triangle cross section. A tread rubber 18 is provided at the outer side of the carcass 14 in the radial direction of the tire. With this, a tread portion 20 is constituted for the motorcycle pneumatic tire 10. The carcass 14 is provided with a side rubber 26 on an outer side thereof in the axial direction of the tire. With this, a sidewall 28 is constituted for the motorcycle pneumatic tire 10 of this embodiment.

A spiral belt 30 is disposed between the carcass 14 and the tread rubber 18. The spiral belt 30 comprises at least one layer of a belt ply which is formed by spirally winding a rubber-coated cord 32 coated with rubber along a circumferential direction of the tire. As shown in FIG. 1, a range occupying 40% around a tire equatorial plane CL with respect to a tread creepage width TW is defined as a center area CA, and a region from the center area CA to the tread ends 20A are defined as shoulder areas SA. The spiral belt 30 is disposed such as to be astride between the left and right both side shoulder areas SA from the center area CA of the tread rubber 18.

A tensile strength of the rubber-coated cord 32 of the spiral belt 30 is 0.27 N or higher. More concretely, a non-extensible high elastic aramid cord having a tensile strength in a range of from 0.27 N to 0.76 N is used as the rubber-coated cord 32 of the spiral belt 30. A non-extensible high elastic steel cord having a tensile strength in a range of from 0.38 N to 1.07 N may be used as the rubber-coated cord 32 of the spiral belt 30. At that time, the high elastic steel cord may comprise an open cord or an open cord having 1×2 configuration.

In this embodiment, the number of cords embedded in the spiral belt 30 in the center area CA is higher than that in the shoulder area SA. That is, the number of cords embedded in the spiral belt 30 in the center area CA of the spiral belt 30 is set to 30 to 70/50 mm, and the number of cords embedded in the shoulder area SA of the spiral belt 30 is set to 10 to 45/50 mm.

At that time, when the number of cords embedded in the center area CA of the spiral belt 30 is defined as Nmc and the number of cords embedded in the shoulder area SA of the spiral belt 30 is defined as Nms, the number of cords is set such that Nmc/Nms=1.5 to 3.0 (A).

In this embodiment, when a tangent loss factor of 4% of distortion of the tread rubber 18 at 50° C. is defined as tan σ and a dynamic storage elastic modulus is defined as E', tan σ/E' is set to 0.06 to 0.14 $Pa^{-1}$ in the center area CA of the tread rubber 18, and tan σ/E' is set to 0.12 to 0.16 $MPa^{-1}$ in the shoulder area SA.

At that time, when tan σ/E' in the center area CA of the tread rubber 18 is defined as TEc and tan σ/E' in the shoulder area SA of the tread rubber 18 is defined as TEs, TEc/TEs is set to 0.4 to 0.9(B).

Next, an effect of the motorcycle pneumatic tire 10 according to the embodiment will be explained. This embodiment has the above-described structure. The number of cords to be embedded and the physical properties of rubber required for satisfying all of high-speed durability, turning performance and slide controllability are selected for the center area CA where high-speed durability is required and the shoulder area SA where turning performance (grip performance) and slide controllability are required.

That is, the number of cords embedded in the spiral belt 30 in the center area CA of the spiral belt 30 is set higher than that in the shoulder area SA and the number of cords embedded in the center area CA of the spiral belt 30 is set to 30 to 70/50 mm and the number of cords embedded in the shoulder area SA of the spiral belt 30 is set to 10 to 45/50 mm, and when the number of cords embedded in the center area CA of the spiral belt 30 is defined as Nmc and the number of cords embedded in the shoulder area SA of the spiral belt 30 is defined as Nms, Nmc/Nms=1.5 to 3.0 (A) is satisfied. With this, a sufficient number of cords embedded in the spiral belt 30 is secured to enhance a diameter expansion binding force in the center area CA which comes into contact with the ground when traveling straightly, the number of cords embedded in the shoulder area SA which comes into contact when cornering is set to be lower than that of the center area CA and with this, it is possible to suppress the generation of a lateral force in the shoulder area.

As a result, high-speed durability in the center area CA can be enhanced, the threshold limit value of the lateral force in the shoulder area SA can be suppressed to a low level, performance when the threshold is exceeded can be ameliorated and, thus, the slide controllability can be enhanced.

Further, As in this embodiment, when a tangent loss factor of 4% of distortion of the tread rubber 18 at 50° C. is defined as tan σ and a dynamic storage elastic modulus is defined as E', tan σ/E' is set to 0.06 to 0.14 $Pa^{-1}$ in the center area CA of the tread rubber 18, and tan σ/E' is set to 0.12 to 0.16 $MPa^{-1}$ in the shoulder area SA. When tan σ/E' in the center area CA of the tread rubber 18 is defined as TEc and tan σ/E' in the shoulder area SA of the tread rubber 18 is defined as TEs, TEc/TEs is set to 0.4 to 0.9(B). With this, a rubber having physical properties of high heat-resistance sufficient to satisfy the high-speed durability is disposed in the center area CA, and a rubber having physical properties of high grip performance is disposed in the shoulder area SA.

If the rubber having high heat-resistance physical properties sufficient to satisfy the high-speed durability is disposed in the center area CA, a sufficient number of cords embedded in the spiral belt 30 can be secured to enhance the diameter expansion binding force in the center area CA, and high-speed durability can also be achieved.

Further, if the rubber having physical properties of high grip performance is disposed in the shoulder area SA, the lateral force which was reduced because the number of cords embedded in the shoulder area SA was set lower than that of the center area CA, can be compensated for and, thus, both turning performance and slide controllability can be achieved.

A region of the tire from the end of the center area CA, which occupies an area of 40% centered on the equatorial plane of the tire 10 with respect to respect to the tread surface lateral width TW, to the tread end 20A is the shoulder area SA. This is because a ground-contact width of the tire 10 when cornering at a camber angle of 30° or higher at the speed of 80 km/h in the motorcycle falls within the above range.

If the number of cords embedded in the center area CA of the spiral belt 30 is set smaller than 30/50 mm, a force for binding the expansion of the carcass 14 in the radial direction of the tire 10 cannot be obtained, and a desired shape of the tire 10 and a desired high-speed durability cannot be secured. If the number of cords embedded in the center area CA of the spiral belt 30 is set higher than 70/50 mm, cords are superposed on each other, causing problems in the production process.

If the number of cords embedded in the shoulder area SA of the spiral belt 30 is set smaller than 10/50 mm, the lateral force in the shoulder area SA becomes excessively small, and a grip force at the time of cornering can not be secured. If the number of cords embedded in the shoulder area SA of the spiral belt 30 is set higher than 45/50 mm, the lateral force in the shoulder area SA becomes excessively high, performance when the lateral force threshold value is exceeded becomes erratic, and slide controllability cannot be secured.

If the relation between the number of cords Nmc in the center area CA of the spiral belt 30 and the number of cords Nms in the shoulder area SA of the spiral belt 30 becomes smaller than Nmc/Nms=1.5, the number of cords embedded in the center area CA and the number of cords embedded in the shoulder area SA become substantially equal to each other and thus, the threshold limit value of the lateral force in the shoulder area SA is maintained at a high level, performance when the threshold limit value of the lateral force becomes unpredictable, and slide controllability can not be secured. If the relation between the number of cords Nmc embedded in the center area CA of the spiral belt 30 and the number of cords Nms embedded in the shoulder area SA of the spiral belt 30 becomes greater than Nmc/Nms=3.0, a difference in rigidity between the center area CA and the shoulder area SA becomes excessively large, there is too large a difference lateral force between the center area CA and the shoulder area SA, and the steering stability deteriorates.

The higher the TEc (=tan σ/E') in the center area CA of the tread rubber 18, the higher grip performance in the center area CA becomes, and the smaller the TEc (=tan σ/E') in the center area CA of the tread rubber 18 is, the higher the high-speed durability becomes. At that time, if the TEc in the center area CA of the tread rubber 18 is set smaller than 0.06 MPa$^{-1}$, the rubber becomes excessively hard, and unevenness-absorbing performance at the time of straight travel becomes inferior. If TEc in the center area CA of the tread rubber 18 is set greater than 0.14 MPa$^{-1}$, high-speed durability can not be secured.

If TEs (=tan σ/E') in the shoulder area SA of the tread rubber 18 is set smaller than 0.12 MPa$^{-1}$, turning performance (grip performance) can not be secured. If TEs in the shoulder area SA of the tread rubber 18 is set greater than 0.16 MPa$^{-1}$, the lateral force in the shoulder area SA becomes excessively strong, performance when the threshold limit of the lateral force is exceeded becomes erratic, and slide controllability cannot be secured.

If the value of TEc/TEs is set smaller than 0.4, the difference in rigidity between the center area CA and the shoulder area SA becomes excessively large, there is a large difference in the lateral force between the center area CA and the shoulder area SA, and the steering stability deteriorates. That is, handling neutrality deteriorates near the boundary between the center area CA and the shoulder area SA. If the TEc/TEs value is set greater than 0.9, the physical properties of the rubber become substantially equal in across the center area CA and the shoulder area SA, and the above-mentioned respective performances cannot be satisfied.

If the tensile strength of the rubber-coated cord 32 of the spiral belt 30 is set 0.27 N or higher as in this embodiment, it is possible to suppress the growth of the carcass 14 in the tire vulcanizing process, and a desired tire 10 shape can be obtained. Further, sufficient rigidity of the spiral belt 30 can be secured. If the tensile strength of the rubber-coated cord 32 of the spiral belt 30 is less than 0.27 N, growth of the carcass 14 can not be suppressed in the tire vulcanizing process, and the desired shape of the tire 10 cannot be obtained. Further, the rigidity of the spiral belt 30 becomes insufficient. Thus, a member for reinforcing the spiral belt 30 is required, and this causes the problem that the weight is increased and productivity is deteriorated.

If a non-extensible high elastic aramid cord having the tensile strength of from 0.27 N to 0.76 N is used in the rubber-coated cord 32 of the spiral belt 30, it is possible to obtain the desired tire shape and rigidity without causing problems in the production process. If the non-extensible high elastic steel cord having the tensile strength of from 0.38 N to 1.07 N is used for the rubber-coated cord 32 of the spiral belt 30, it is possible to obtain the desired tire shape and rigidity without causing problems in the production process. At that time, if the high elastic steel cord comprises an open cord, it is possible to obtain the desired tire shape and rigidity more precisely. When the high elastic steel cord comprises an open cord having 1×2 configuration, it is possible to obtain the desired tire shape and rigidity more precisely.

According to the motorcycle pneumatic tire 10 of the embodiment, as described above in detail, the number of cords embedded in the center area CA of the spiral belt 30 is set higher than that in the shoulder area SA, and the rubber having high heat-resistance is disposed in the shoulder area of the tread rubber 18. With this, high-speed durability can be achieved.

If the number of cords embedded in the shoulder area SA of the spiral belt 30 is set smaller than that in the center area CA, the limit value of the lateral force can be suppressed to a low value. If a rubber having physical properties of high grip performance is disposed in the shoulder area SA, a lateral force which was reduced because the number of cords embedded in the shoulder area SA was set lower than that of the center area CA can be compensated and thus, both turning performance and slide controllability can be achieved.

Next, performance evaluation of the motorcycle pneumatic tire according to the embodiment will be explained. To confirm the effect of the invention, performance of the motorcycle pneumatic tire of the embodiment to which the invention is applied and performance of a motorcycle pneumatic tire according to a Comparative Example are evaluated. The performance evaluation is carried in such a manner that high-speed durability, turning performance (grip performance) and slide controllability of each pneumatic tire is evaluated (based on feeling), and the performance of the motorcycle pneumatic tire of the embodiment and the performance of the motorcycle pneumatic tire of the Comparative Example are compared with each other.

Concerning high-speed durability, a heat generating degree of the tire at the time of extremely high speed running is measured. If the heat generating degree is high, this may cause a trouble of the tire. As the evaluation value is higher, high-speed durability is more excellent. Concerning turning performance, a cornering speed is measured. As the evaluation value is higher, turning performance is more excellent. Concerning slide controllability, when the running speed is excessively increased and the tire can not turn a corner and the tire starts slipping, a fierce degree of the behavior is evaluated. As the evaluation value is higher, slide controllability is more excellent.

Two kinds of motorcycle pneumatic tires of the embodiment are prepared, and four kinds of motorcycle pneumatic tires of the Comparative Example are prepared. The tire is mounted on a rear wheel of a motorcycle, each tire has a size of 180/55R17, and a rim has a size of MT5.50×17. An internal pressure of the tire is 190 kPa. A motorcycle pneumatic tire having a size of 120/70R17 to which the invention is applied is used as a front tire of the motorcycle used in the evaluation, and a rim having a size of MT3.50×17 is used An internal pressure is 190 kPa, and front tires having common structure are used in evaluations.

Table 1 shows details of motorcycle pneumatic tire of the embodiment and the pneumatic tire of the Comparative Example. A structure of the motorcycle pneumatic tire of the embodiment is applied to motorcycle pneumatic tires of embodiments 1 and 2. The embodiments 1 and 2 have two layer radial structure, and nylon is used in the carcass cord. A steel cord is used in the spiral belt in the embodiment 1, and an aramid fiber cord is used in the spiral belt of the embodiment 2.

As shown in Table 1, in the motorcycle pneumatic tire of a Comparative Example 1, the number of cords embedded in the center area of the spiral belt and the number of cords embedded in the shoulder area of the spiral belt are set to 30/50 mm, and these values are out of the numeric value range of the invention. As shown in Table 1, in the motorcycle pneumatic tire of a Comparative Example 2, the number of cords embedded in the center area of the spiral belt and the number of cords embedded in the shoulder area of the spiral belt are set to 15/50 mm, and these values are out of the numeric value range of the invention.

Further, according to a motorcycle pneumatic tire of a Comparative Example 3, TEc in the center area of the tread rubber and TEs in the shoulder area of the tread rubber are both 0.10 MPa$^{-1}$ as shown in Table 1, and these values are out of the numeric value range of the invention. Further, according to a motorcycle pneumatic tire of a Comparative Example 4, TEc in the center area of the tread rubber and TEs in the shoulder area of the tread rubber are both 0.15 MPa$^{-1}$ as shown in Table 1, and these values are out of the numeric value range of the invention.

From the result in Table 1, the motorcycle pneumatic tire of the Comparative Example 1 has excellent high-speed durability and turning performance, but slide controllability is inferior. The motorcycle pneumatic tire of the Comparative Example 2 has excellent turning performance and slide controllability, but high-speed durability is inferior. The motorcycle pneumatic tire of the Comparative Example 3 has excellent high-speed durability and slide controllability, but turning performance is inferior. The motorcycle pneumatic tire of the Comparative Example 4 has excellent turning performance and slide controllability, but high-speed durability is inferior. That is, the motorcycle pneumatic tires of the Comparative Examples 1 to 4 can not satisfy all of high-speed durability, turning performance and slide controllability.

Whereas, it is clear that the motorcycle pneumatic tires of the examples 1 and 2 can satisfy all of high-speed durability, turning performance and slide controllability.

INDUSTRIAL APPLICABILITY

The present invention has the above-described structure, and it is possible to satisfy all of high-speed durability, turning performance and slide controllability as a motorcycle tire, and its applicability is extremely wide.

Explanation of Reference Numerals 10 motorcycle pneumatic tire
12 bead core
14 carcass
16 bead apex rubber
18 tread rubber
20 tread portion
20A tread end
26 side rubber
28 sidewall
30 spiral belt
32 rubber-coated cord

TABLE 1

|  |  | Embodiment 1 | Embodiment 2 | Comparative Example 1 | Comparative Example 2 | Comparative Example 3 | Comparative Example 4 |
|---|---|---|---|---|---|---|---|
| Carcass structure |  | Nylon, two layer radial | ← | ← | ← | ← | ← |
| Material of belt cord |  | Steal | Aramid | Steal | ← | ← | ← |
| Driven number of cords | Nmc | 30/50 mm | ← | ← | 15/50 mm | 30/50 mm | ← |
|  | Nms | 15/50 mm | ← | 30/50 mm | 15/50 mm | ← | ← |
| Rubber Physical properties | Tec | 0.10 Mpa$^{-1}$ | ← | ← | ← | ← | 0.15 Mpa$^{-1}$ |
|  | TEs | 0.15 Mpa$^{-1}$ | ← | ← | ← | 0.10 Mpa$^{-1}$ | 0.15 Mpa$^{-1}$ |

Table 2 shows a result of performance evaluations of motorcycle pneumatic tires of the embodiments and motorcycle pneumatic tires of the Comparative Examples.

TABLE 2

|  | Embodiment 1 | Embodiment 2 | Comparative Example 1 | Comparative Example 2 | Comparative Example 3 | Comparative Example 4 |
|---|---|---|---|---|---|---|
| High-speed durability | 110 | 100 | 110 | 90 | 110 | 90 |
| Turning performance (grip performance) | 110 | 100 | 120 | 110 | 90 | 110 |
| Slide controllability | 110 | 110 | 80 | 110 | 100 | 110 |

The invention claimed is:

1. A pneumatic tire for a motorcycle comprising:

a pair of left and right bead cores extending along a circumferential direction of the tire;

bead apex rubbers which are respectively disposed at outer sides of the pair of left and right bead cores in a radial direction of the tire and which have triangular cross sections;

a carcass which extends between the pair of left and right bead cores in a toroidal shape, which has both ends in a widthwise direction of the tire folded back around the pair of left and right bead cores and retained thereat, and which includes at least one layer of carcass ply having a plurality of rubber-coated carcass cords arranged at an inclination angle of from 60° to 90° with respect to an equatorial plane of the tire;

a tread rubber which is provided at an outer side of the carcass in the radial direction of the tire and which constitutes a tread portion;

a pair of left and right side rubbers which are provided at the outer side of the carcass in an axial direction of the tire and which constitute a sidewall; and a spiral belt which is provided between the carcass and the tread rubber, which includes at least one belt ply layer formed by spirally winding a rubber-coated cord along the circumferential direction of the tire, and when a region from an edge of a center area that occupies 40% of the tread centered on the tire equatorial plane with respect to the tread surface lateral width, to tread ends is defined as a shoulder area, the spiral belt is disposed to extend across both left and right shoulder areas from the center area of the tread rubber, wherein the number of cords embedded in the spiral belt in the center area is higher than that in the shoulder area, the number of cords embedded in the spiral belt in the center area is set to from 30 to 70/50 mm, the number of cords embedded in the spiral belt in the shoulder area is set to from 10 to 45/50 mm, when the number of cords embedded in the spiral belt in the center area is defined as Nmc and the number of cords embedded in the spiral belt in the shoulder area is defined as Nms, the relationship (A) Nmc/Nms=1.5 to 3.0 is satisfied, when a tangent loss factor of 4% distortion of the tread rubber at 50° C. is defined as tan σ and a dynamic storage elastic modulus is defined as E', the tread rubber is set to tan σ/E'=0.06 to 0.14 MPa$^{-1}$ in the center area and the tread rubber is set to tan σ/E'=0.12 to 0.16 MPa$^{-1}$ in the shoulder area, and when the tan σ/E' of the tread rubber in the center area is defined as TEc and the tan σ/E' of the tread rubber in the shoulder area is defined as TEs, the relationship (B) TEc/TEs=0.4 to 0.9 is satisfied.

2. The pneumatic tire for a motorcycle of claim 1, wherein the rubber-coated cord of the belt ply has a tensile strength of 0.27 N or higher.

3. The pneumatic tire for a motorcycle of claim 1, wherein an aramid cord having a tensile strength of from 0.27 N to 0.76 N is used as the rubber-coated cord of the belt ply.

4. The pneumatic tire for a motorcycle of claim 1, wherein the rubber-coated cord of the belt ply is a steel cord having a tensile strength of from 0.38 N to 1.07 N.

5. The pneumatic tire for a motorcycle of claim 4, wherein the steel cord comprises an open cord.

6. The pneumatic tire for a motorcycle of claim 4, wherein the steel cord comprises an open cord having a 1×2 configuration.

7. A pneumatic tire for a motorcycle comprising:

a pair of left and right bead cores extending along a circumferential direction of the tire;

a carcass which extends between the pair of left and right bead cores in a toroidal shape, which has both ends in a widthwise direction of the tire folded back around the pair of left and right bead cores and retained thereat, and which includes at least one layer of carcass ply having a plurality of rubber-coated carcass cords;

a tread rubber which is provided at an outer side of the carcass in the radial direction of the tire and which constitutes a tread portion;

a spiral belt which is provided between the carcass and the tread rubber, which includes at least one belt ply layer formed by spirally winding a rubber-coated cord along the circumferential direction of the tire;

a center area is centered on a tire equatorial plane and respective shoulder areas disposed from one edge of the center area to tread ends; and wherein:

the number of cords embedded in the spiral belt in the center area is higher than that in either one of the shoulder areas, the number of cords embedded in the spiral belt in the center area is defined as Nmc and the number of cords embedded in the spiral belt in at least one of the shoulder areas is defined as Nms, and a relationship (A) Nmc/Nms is 1.5 to 3.0, a tangent loss factor of 4% distortion of the tread rubber at 50° C. is defined as tan σ and a dynamic storage elastic modulus is defined as E', the tread rubber is set to tan σ/E'=0.06 to 0.14 MPa$^{-1}$ in the center area and the tread rubber is set to tan σ/E'=0.12 to 0.16 MPa$^{-1}$ in at least one of the shoulder areas, and the tan σ/E' of the tread rubber in the center area is defined as TEc and the tan σ/E' of the tread rubber in at least one of the shoulder areas is defined as TEs, and a relationship (B) TEc/TEs is 0.4 to 0.9.

8. The pneumatic tire for a motorcycle of claim 7, wherein the rubber-coated cord of the belt ply has a tensile strength of 0.27 N or higher.

9. The pneumatic tire for a motorcycle of claim 7, wherein an aramid cord having a tensile strength of from 0.27 N to 0.76 N is used as the rubber-coated cord of the belt ply.

10. The pneumatic tire for a motorcycle of claim 7, wherein the rubber-coated cord of the belt ply is a steel cord having a tensile strength of from 0.38 N to 1.07 N.

11. The pneumatic tire for a motorcycle of claim 10, wherein the steel cord comprises an open cord.

12. The pneumatic tire for a motorcycle of claim 10, wherein the steel cord comprises an open cord having a 1×2 configuration.

13. The pneumatic tire for a motorcycle of claim 7, further comprising bead apex rubbers which are respectively disposed at outer sides of the pair of left and right bead cores in a radial direction of the tire and which have triangular cross sections.

14. The pneumatic tire for a motorcycle of claim 7, wherein the number of cords embedded in the spiral belt in the center area is set to from 30 to 70/50 mm, and the number of cords embedded in the spiral belt in the shoulder areas is set to from 10 to 45/50 mm.

15. The pneumatic tire for a motorcycle of claim 7, further comprising a pair of left and right side rubbers which are provided at the outer side of the carcass in an axial direction of the tire and which constitute a sidewall.

16. The pneumatic tire for a motorcycle of claim 7, wherein the carcass cords of the carcass ply are arranged at an inclination angle of from 60° to 90° with respect to an equatorial plane of the tire.

17. The pneumatic tire for a motorcycle of claim 7, wherein the center area occupies 40% of the tread with respect to a tread surface lateral width.

* * * * *